(12) United States Patent
Sanborn (10) Patent No.: US 11,064,829 B2
(45) Date of Patent: Jul. 20, 2021

(54) ADJUSTABLE CONTAINER HOLDER

(71) Applicant: Luke Sanborn, Shelton, CT (US)

(72) Inventor: Luke Sanborn, Shelton, CT (US)

( * ) Notice: Subject to any disclaimer, the term of this patent is extended or adjusted under 35 U.S.C. 154(b) by 142 days.

(21) Appl. No.: 16/155,069

(22) Filed: Oct. 9, 2018

(65) Prior Publication Data

US 2019/0343313 A1 Nov. 14, 2019

Related U.S. Application Data

(60) Provisional application No. 62/669,016, filed on May 9, 2018.

(51) Int. Cl.
| | | |
|---|---|---|
| *A47G 23/02* | (2006.01) | |
| *F16B 1/00* | (2006.01) | |
| *F16B 2/08* | (2006.01) | |

(52) U.S. Cl.
CPC ..... *A47G 23/0216* (2013.01); *A47G 23/0241* (2013.01); *A47G 23/0266* (2013.01); *F16B 1/00* (2013.01); *F16B 2/08* (2013.01); *A47G 2400/08* (2013.01); *F16B 2001/0028* (2013.01)

(58) Field of Classification Search
CPC ............ A47G 23/0216; A47G 23/0266; A47G 23/0241; A47G 2400/08; A47G 23/02; F16B 2/08; F16B 1/00; F16B 2001/0028
USPC .................. 248/346.07, 311.2; 220/737, 739
See application file for complete search history.

(56) References Cited

U.S. PATENT DOCUMENTS

| | | | |
|---|---|---|---|
| 2,531,052 A | | 11/1950 | Kehoe |
| 4,379,541 A | | 4/1983 | Harkness |
| 4,715,633 A | | 12/1987 | Brink et al. |
| 4,877,284 A | | 10/1989 | Doane |
| 5,390,887 A | * | 2/1995 | Campbell .............. B60N 3/103 224/42.32 |
| 5,474,272 A | * | 12/1995 | Thompson ............... A47C 7/68 248/311.2 |
| 5,839,710 A | | 11/1998 | Hubbard |
| 5,967,345 A | * | 10/1999 | Subotin .................... A47C 7/70 211/119.007 |
| 6,264,154 B1 | | 7/2001 | Hiscox et al. |
| 6,758,452 B1 | | 7/2004 | Salenbauch et al. |
| 6,863,200 B2 | | 3/2005 | Beglau |
| D570,162 S | * | 6/2008 | Blais .............................. D7/620 |
| 8,205,767 B2 | | 6/2012 | Lawlor et al. |
| 9,428,313 B2 | * | 8/2016 | Olsen ..................... B65D 63/10 |
| 9,616,817 B2 | | 4/2017 | Dyle |
| 9,714,061 B1 | | 7/2017 | Delgado deLeon |
| 9,803,681 B2 | | 10/2017 | Esposito |
| 9,931,969 B1 | | 4/2018 | Muldowney |

(Continued)

*Primary Examiner* — Muhammed Ijaz
(74) *Attorney, Agent, or Firm* — McCormick, Paulding & Huber PLLC (57) ABSTRACT

An adjustable container holder for holding cups, cans, glasses, bottles, and the like has a structural base with a cylindrical sidewall bearing a slot or slots for an adjustable strap. The strap passes through a slot from the outer side of the base to the inner side, wraps around the inner side and any container placed in the base, and passes through the same slot, or a closely adjacent slot, from the inner side to the outer side of the base where an adjustable attachment secures the strap. With both ends of the strap secured under tension and wrapped around a container, the container of variable size is captured in the structural base along all or a substantial portion of the container periphery.

15 Claims, 5 Drawing Sheets

(56) References Cited

U.S. PATENT DOCUMENTS

| | | | |
|---|---|---|---|
| 10,617,247 B1* | 4/2020 | Galdun | A47G 23/0216 |
| 2007/0170189 A1* | 7/2007 | Carlile | A45F 5/02 |
| | | | 220/739 |
| 2014/0263311 A1* | 9/2014 | Di Tata | B65D 25/20 |
| | | | 220/17.1 |
| 2016/0272100 A1* | 9/2016 | Lliorca | A47G 23/02 |
| 2017/0349327 A1* | 12/2017 | Cwojdzinski | B65D 23/003 |
| 2019/0343313 A1* | 11/2019 | Sanborn | A47G 23/0266 |

* cited by examiner

ADJUSTABLE CONTAINER HOLDER

CROSS REFERENCE TO RELATED APPLICATION

This application claims priority to U.S. Provisional Patent Application Ser. No. 62/669,016, filed on May 9, 2018, which is hereby incorporated by reference in its entirety.

FIELD OF THE INVENTION

The present invention relates to an adjustable container holder for holding cups, cans, glasses, bottles, and the like. The containers may be used for holding liquids or dry goods. Typically the containers may be used for holding beverages, such as coffee, sodas, or drinking water.

BACKGROUND OF THE INVENTION

The invention is concerned principally with the problem of stabilizing a container such as a coffee cup or milk glass so that the container cannot be easily knocked over and spill the contents, whether the contents are liquid or solid. The problem can arise when attempting to pour a liquid into the container, or when the container is filled and is knocked over while in a rest position on a flat surface. With the container stabilized by the invention, the person attempting to fill the container can have both hands free to hold the pouring pitcher or pot. The stabilization of the container can also avoid damage to the table or furniture and surroundings such as a laptop computer or documents due to the spilled contents.

Another consideration in the designing of a container holder is the fact that containers for liquids or solids do not all have a uniform size or shape. To provide the desired stability, a container needs to be firmly engaged by the holder. To achieve firm engagement and wide-ranging versatility, a container holder needs to be adjustable for various sizes and shapes of containers.

Adjustable cupholders providing stability and versatility for cups and glasses of various sizes are known in the art. U.S. Pat. No. 58,205,767 discloses an adjustable beverage holder with an actuator ring and pivotal arms to adjust the size of the holder. U.S. Pat. No. 9,428,313 utilizes a resilient member stretched across the cavity of a ring-shaped member to hold a container by means of a three-point contact system when the container is inserted into the cavity. U.S. Pat. No. 9,931,969 discloses an adjustable cupholder in an automobile console with a spiraling fitting to adjust the size of the holder.

While the adjustable cupholders of the prior art provide support for various cups and glasses, it is still desirable to have an adjustable container holder that is flexible to engage containers of various sizes and shapes and secure the containers firmly in the holder. This objective is accomplished in accordance with the present invention.

SUMMARY OF THE INVENTION

The present invention relates to an adjustable container holder comprised by a structural base having a generally cylindrical sidewall with an outer side and an inner side, and an opening at one or both ends. The cylindrical sidewall has one slot, or two closely adjacent slots, each slot extending in the sidewall between the opposite ends of the sidewall.

An adjustable strap having one end and an opposite end is secured by the one end at the outer side of the cylindrical sidewall of the structural base. The strap extends from the secured end at the outer side of the base through the one slot in the sidewall to the inner side of the sidewall and wraps around the inner side of the sidewall to define a cavity within the structural base for receipt of a container. The opposite end of the adjustable strap then extends from the inner side of the sidewall through the same or the other closely adjacent slot to the outer side of the sidewall. There the opposite end of the strap is secured to an adjustable attachment.

With the described components a container of variable size can be placed in the cavity defined in the structural base and be grasped around a substantial portion of the periphery of the container in the cavity by drawing the opposite end of the adjustable strap tight around the container and securing the opposite end of the strap to the adjustable attachment on the outer side of the cylindrical sidewall. With the strap drawn tight, the container is securely gripped within the holder, and when the container is picked up for pouring or drinking its contents, the holder remains attached to the bottom of the container. With the holder remaining attached, the container and holder are portable and can be moved together from location to location. Also, the container need not be removed from and re-secured to the holder every time a drink is taken from the container or its contents are poured out.

The adjustable container holder can be enhanced by means of cushioning material lining an inward facing portion of the adjustable strap within the structural base for frictional engagement with a retained container. Such a liner provides an even more firm engagement of the container by the holder and accommodates a wide array of container shapes at the same time.

The adjustable container holder can be weighted to provide greater resistance to toppling by means of the material from which the structural base is made or by adding additional weight to the structural base.

Ideally the adjustable container holder is made with materials that are washable for cleaning purposes. For example, the structural base can be made from plastic or metal, and the cushioning material can be a synthetic elastomer or rubber-like material.

Other benefits and advantages of the adjustable container holder may be noted from the following description of the invention.

DETAILED DESCRIPTION OF THE PREFERRED EMBODIMENTS

Figure 1:
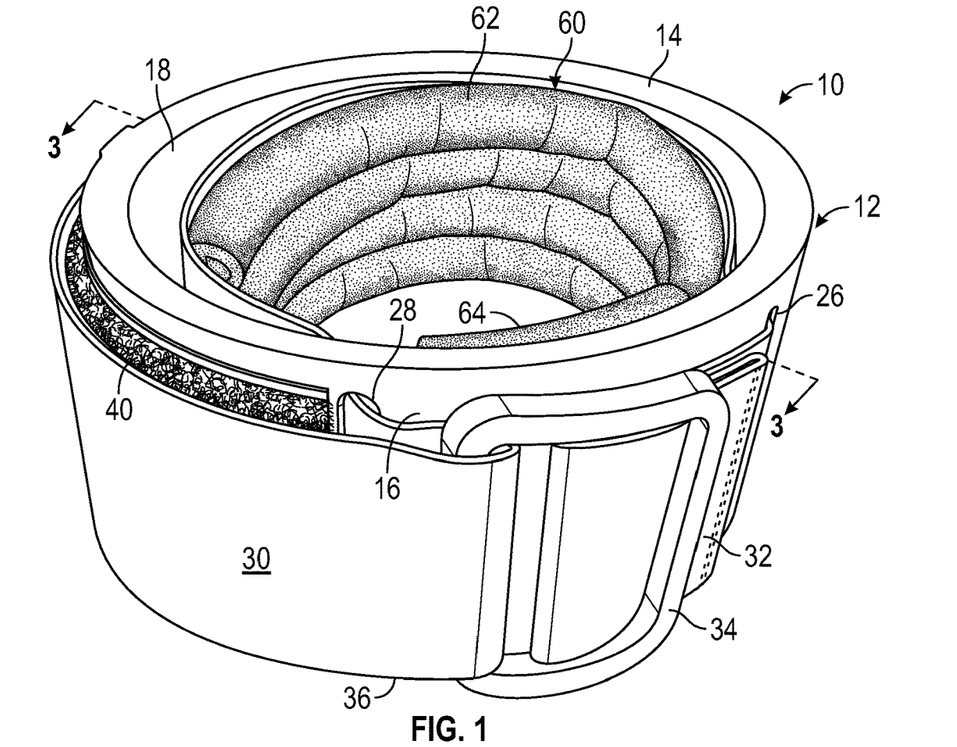
FIG. 1 is a perspective view of my adjustable container holder as seen from the front with the adjustable strap secured to the outer sidewall of the holder.

FIG. 1 illustrates a first embodiment of my adjustable container holder 10 that can be used for holding and stabilizing a container, such as a beverage cup, a can, a bottle, a glass, and the like. The holder 10 is adjustable to receive and securely hold containers of various sizes so the containers cannot tumble or be knocked over and spill their contents when struck from the side or set down on a sloping surface.

Figure 2:
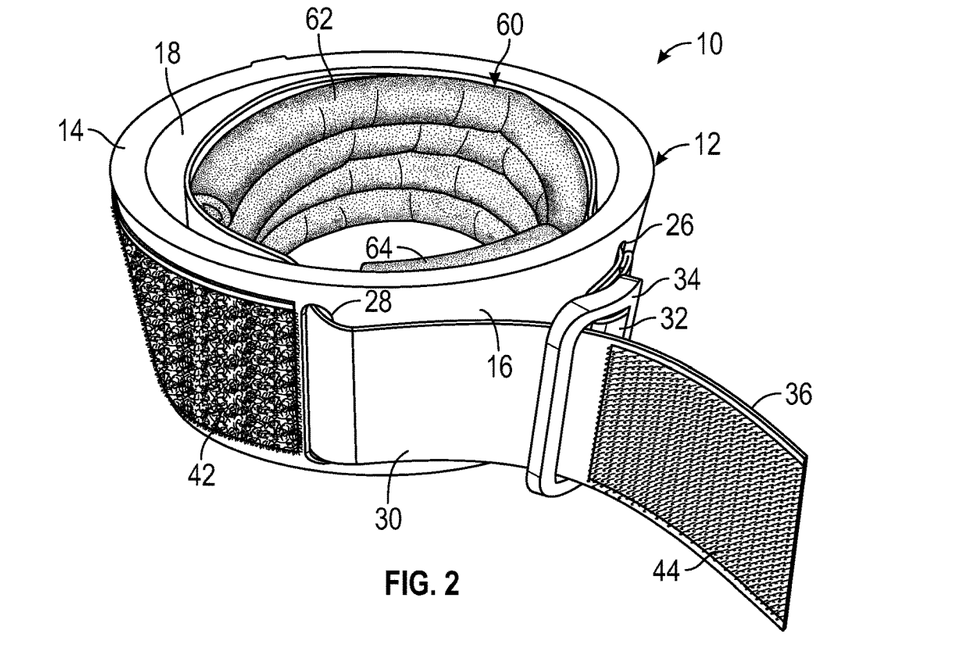
FIG. 2 is a perspective view of my adjustable container in FIG. 1 with the adjustable strap detached from the adjustable attachment on the outer sidewall of the holder.
Figure 3:
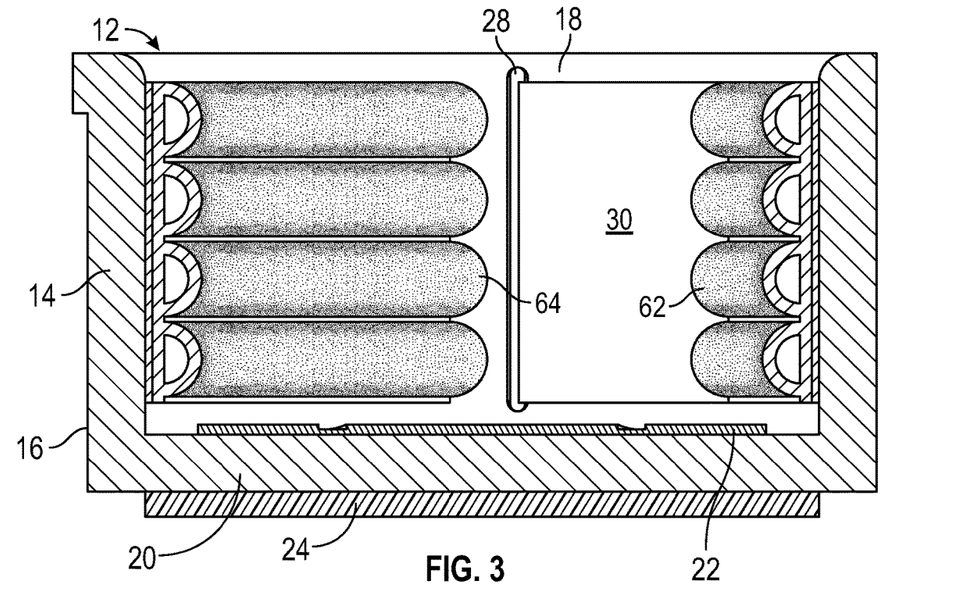
FIG. 3 is cross sectional view of my adjustable container holder as seen at the vertical sectioning plane 3-3 in FIG. 1.

As shown in FIGS. 1, 2, and 3 the adjustable container holder 10 is comprised by a structural base 12 having a generally cylindrical sidewall 14 with an outer side 16 and inner side 18. The term "cylindrical" refers to a body of generated by a generating element that is revolved around an axis along a closed path that can be circular, hexagonal, or some other shape. The generating element may be inclined relative to the axis so that the resulting body has a tapered shape along its length between the ends of the cylinder. The structural base may also have a bottom wall 20 as shown most clearly in FIG. 3 to support a container in the holder while the container is being secured as explained hereafter.

The structural base 12 can be made from a variety of materials such as polyvinyl chloride or polyethylene plastic. The base can also be made from a metal such as aluminum or steel. It is desirable that the material for the base be washable in ordinary detergents for cleaning and antiseptic reasons.

Figure 6:
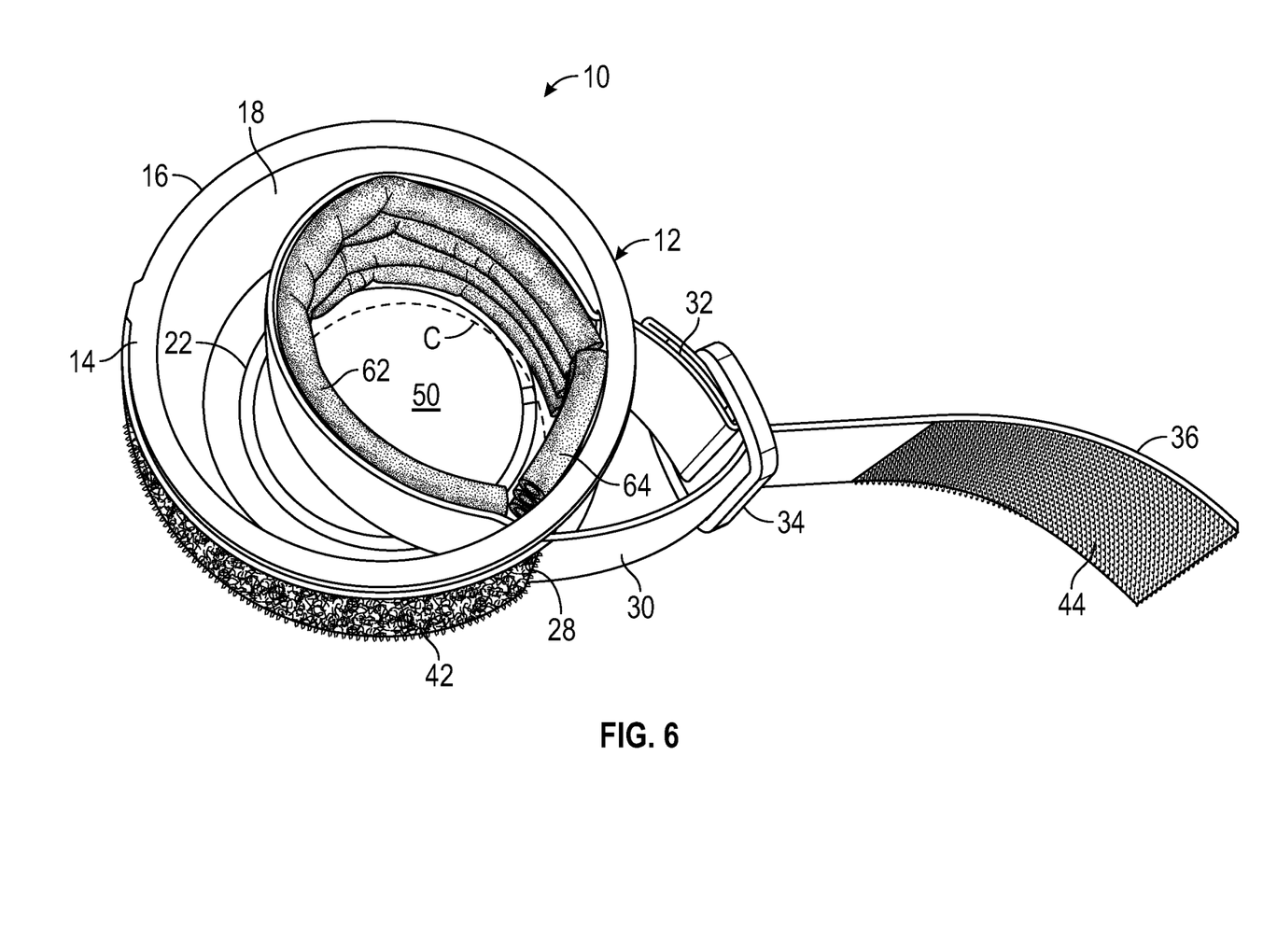
FIG. 6 is a perspective view of my adjustable container holder of FIG. 1 as seen from above with the adjustable reception cavity adjusted to a reduced size.

It is also desirable for the structural base 12 to be weighted for stability purposes. The weighting of the base can be achieved by the thickness and material from which the base is made. Alternatively or additionally, a weight in the form of a thin metal disc 22 can be placed on the bottom wall 20 of the base as shown in FIGS. 3 and 6. A sticky pad 24 made, for example, of rubber is attached to the bottom side of the bottom wall 20 as shown in FIGS. 3 and 4 to prevent the container holder 10 from slipping when placed on smooth surfaces.

Figure 4:
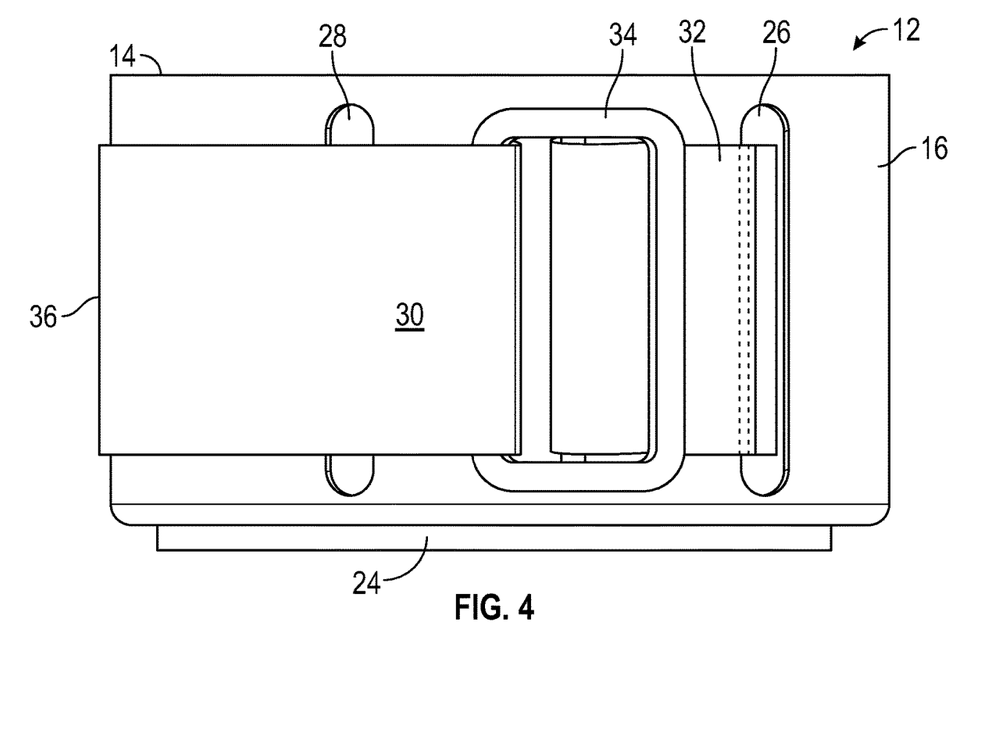
FIG. 4 is a detailed view of the adjustable buckle attachment shown in FIG. 1.

As shown in FIGS. 1, 2, and 4 the sidewall 14 of the structural base 12 has two elongated slots 26 and 28 that are vertically oriented between the ends of the cylindrical sidewall 14. The slots are closely adjacent one another in the circumferential direction. The words "closely adjacent" in connection with slots means that the slots are not disposed at diametrically opposite locations on the sidewall 14, but are generally spaced circumferentially within an angle of 60° or less subtended from the center of the cylindrical sidewall.

An adjustable strap 30 has one end 32 secured to a buckle 34 at the outer side 16 of the sidewall 14, and passes from the outer side to the inner side 18 of the sidewall through the slot 26. After passing through the slot 26 the strap 30 wraps around the inner side of the sidewall 14 as shown in FIGS. 1 and 2. The strap continues to wrap around the inner side of the sidewall to the other slot 28 where the strap passes through the other slot from the inner side 18 of the sidewall to the outer side 16.

At the outer side of the sidewall 14, the end 36 of the strap 30 opposite the end 32 loops through the buckle 34 and folds back against the outer side of the sidewall 14 where the opposite end of the strap is secured by an attachment in the form of an adjustable hook-and-loop fastener 40. As can be seen most clearly in FIG. 2, the hook-and-loop fastener 40, such as sold under the brand name Velcro, is comprised of two parts, the one part 42 being attached to the outer side 16 of the sidewall 14, and the other part 44 being attached to the end 36 of the strap 30. The opposite end of the strap could fold directly onto the outer side of the sidewall 14 without passing through the buckle if the buckle or another securing device captures the end 32 of the strap on the outer side of the sidewall 14.

The buckle 34 can alternatively serve as the adjustable attachment for the opposite end 36 of the strap 30 at the outer side of the sidewall 14 in place of the hook-and-loop fastener 40. In such case the end 36 of the strap would be laced through the buckle 34, and drawn as tight as desired.

Figure 5:
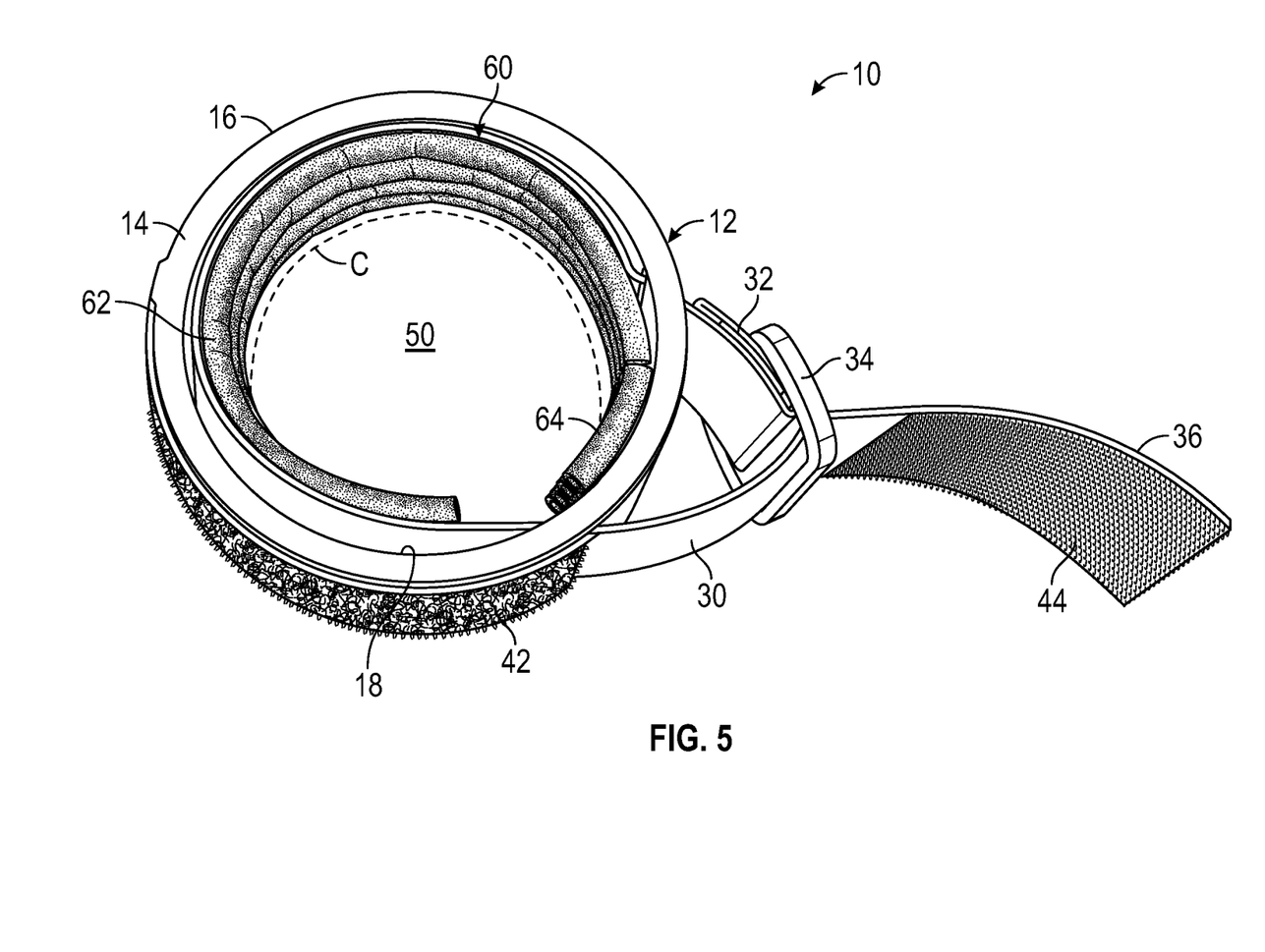
FIG. 5 is a perspective view of my adjustable container holder of FIG. 1 as seen from above with the adjustable reception cavity adjusted to the maximum size.

To improve the engagement and capture of containers of variable size and shape within the holder 10, a resilient cushioning material 60 is provided within the structural base 10. One segment 62 of the cushioning material is attached to the inward facing surface of the strap 30 and another segment 64 is attached to the portion of the inner side 18 of the sidewall 14 between the slots 26 and 28. As shown in FIG. 5 the cushioning segment 62 attached to the strap 30 extends from the slot 26 and ends well before the slot 28 to allow an end segment of the strap to pass through the slot without interference for adjustment.

The resilient cushioning material 60 can be strips of tubular polyethylene foam as illustrated, but can also be an elastomeric or a rubber-like material in sheet form that in addition to being compliant also provides frictional engagement with the periphery of a container in the holder.

The adjustable strap 30 is for the purpose or securing a container of variable size in the adjustable holder 10. As shown most clearly in FIGS. 5 and 6 the adjustable strap 30 with or without resilient cushioning material defines a reception cavity 50 within the structural base 12 for the reception of a container C (illustrated in phantom). In FIG. 5 the strap is shown relaxed and extended outwardly against the inner side 18 of the sidewall 14. In this position, the reception cavity 50 is at its maximum capacity to receive and retain a container C of large size. The strap 30 can then be drawn tight around the container and secured to the outer side of the sidewall 14 by the hook-and-loop fastener 40.

In FIG. 6 the end of the strap 30 has been drawn partially through the slot 28 and is pulled away from the inner side 18 of the sidewall 14. In this position, the reception cavity 50 has been reduced in capacity to receive and retain a container C of smaller size.

However, in each of the positions of the strap in FIG. 5 and FIG. 6, when the strap 30 has been drawn tight against a container C in the cavity 50 and then secured by the fastener 40, the container is grasped around a substantial portion of its periphery for capture in the adjustable holder 10. Thus regardless of the size of the container, the adjustable container holder 10 will establish a firm grip on the container. When the container is lifted for pouring or for drinking the contents, the holder is portable and remains secured to the container. Therefore, the holder and container can be moved from location to location without removing the container from the holder. Also a drink can be taken from the container or the contents can be poured from the container without removing and re-securing the container in the holder.

Figure 7:
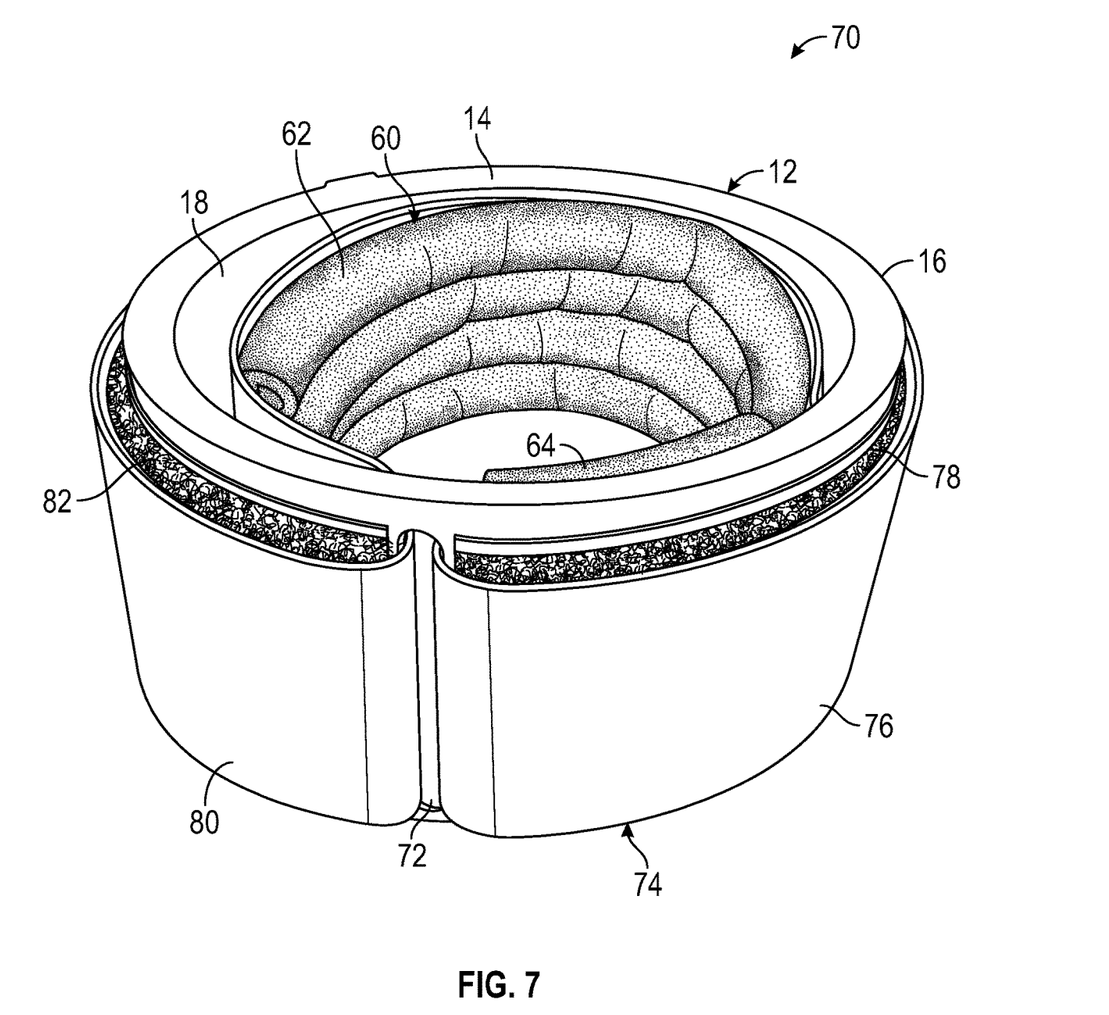
FIG. 7 is a perspective view of another embodiment of my adjustable container holder as seen from the front.

FIG. 7 illustrates a second embodiment of my adjustable container holder 70. In the second embodiment of the holder 70, the parts corresponding to the parts of the first embodiment of the holder 10 in FIG. 1 bear the same reference numbers and will not be described again except to the extent of their role in the second embodiment.

The cylindrical sidewall 14 of the structural base 12 in the holder 70 has a single slot 72 extending vertically between the opposite ends of the sidewall. An adjustable strap 74 has one end 76 secured to the outer side 16 of the sidewall 14 by an attachment 78 which is illustrated as an adjustable hook-and-loop fastener similar to the hook-and-loop fastener 40 in the first embodiment 10 of FIG. 1. The fastener is a two-part fastener having one part secured to the outer side 16 of the sidewall 14 and another part secured to the side of the strap end 76 facing the sidewall. While the attachment 78 is an adjustable hook-and-loop fastener, adjustment of the strap end 76 is not essential and can be omitted as long as the strap end 76 is firmly attached to the sidewall 14, and the other end 80 of the strap can is adjustable.

The end 76 of the strap 74 extends through the single slot 72 from the outer side 16 of the sidewall 14 to the inner side 18, and wraps around the inner side to the sidewall 14 until the strap again reaches the slot 72. At that point the strap passes through the slot 72 from the inner side 18 to the outer side 16 of the sidewall 14 where the opposite end 80 of the strap is secured to the outer side of the sidewall by another adjustable attachment 82. The adjustable attachment 82 may be another hook-and-loop fastener as illustrated, or some other attachment that allows the end 80 of the strap to be secured under tension to the outer side 16 of the sidewall 14 at variable positions.

The second embodiment of my adjustable container holder 70 operates in essentially the same manner as the first embodiment of the holder 10. The adjustable strap 74 with or without cushioning material 60 defines a reception cavity 50 in the middle of the structural base 12 for a container of variable size. The container is placed in the cavity, and the strap is pulled tight around the periphery of the container to secure the container in the holder 70.

Both of the holders 10 and 70 have the advantage of securing a container of variable size by engaging the container around a substantial portion of its periphery. The holder 70 with the single slot engages virtually the entire periphery of a container regardless of the size of the container to securely retain the container in the holder.

Although various embodiments of the present invention have been described and shown, the invention is not restricted thereto, but may also be embodied in other ways within the scope of the subject matter defined in the following claims.

What is claimed is:

1. An adjustable container holder comprising:
   a structural base having a generally cylindrical sidewall with an outer side and an inner side, and an opening at one of two opposite ends of the cylindrical sidewall, the cylindrical sidewall having at least one slot, or two closely adjacent slots, the slot or slots extending in the cylindrical sidewall between the opposite ends of the cylindrical sidewall;
   an adjustable strap having one end and an opposite end, the one end being secured at the outer side of the cylindrical sidewall of the structural base, the adjustable strap extending from the one end through the at least one slot to the inner side of the cylindrical sidewall and wrapping around the inner side of the cylindrical sidewall to define a reception cavity within the structural base, the opposite end of the adjustable strap extending from the inner side of the sidewall through the at least one slot or the other closely adjacent slot to the outer side of the cylindrical sidewall;
   an adjustable attachment on the outer side of the cylindrical sidewall to which the opposite end of the adjustable strap can be secured for adjustment; and
   a resilient cushioning material lining at least a portion of the reception cavity along the inwardly facing side of the adjustable strap within the structural base;
   whereby a container when placed in the reception cavity defined in the structural base is substantially circumscribed by the adjustable strap and is grasped around a substantial portion of a periphery of the container in the reception cavity by drawing the opposite end of the adjustable strap tight around the container and securing the opposite end of the adjustable strap to the adjustable attachment on the outer side of the cylindrical sidewall, and the closer the one slot and the closely adjacent slot, the larger the portion of the periphery of the container grasped by the adjustable strap.

2. The adjustable container holder as defined in claim 1 wherein the cushioning material is an elastomeric material providing a frictional engagement with the periphery of the container in the reception cavity.

3. The adjustable container holder as defined in claim 1 wherein:
   the structural base has both the at least one slot and the other closely adjacent slot;
   the adjustable attachment is a buckle positioned between the at least one slot and the other slot at the outer side of the structural base; and
   the one end of the adjustable strap is secured to the buckle and the opposite end of the adjustable strap is laced through the buckle for adjustment.

4. The adjustable container holder as defined in claim 1 wherein:
   the adjustable attachment on the outer side of the structural base is comprised of a two-part hook and loop fastener with one part secured to the outer side of the base and the other part secured to the opposite end of the adjustable strap.

5. The adjustable container holder as defined in claim 1 wherein:
   the structural base includes an added weight to make the container holder heavy and resistant to toppling over.

6. The adjustable container holder as defined in claim 1 wherein the structural base has a bottom wall at one end of the cylindrical sidewall opposite the end having the opening.

7. The adjustable container holder as defined in claim 6 wherein the bottom wall has an outer bottom side, and a sticky pad is connected to the outer bottom side.

8. The adjustable container holder as defined in claim 1 wherein the structural base is made of a plastic material.

9. The adjustable container holder as defined in claim 1 wherein the structural base is made of metal.

10. An adjustable container holder comprising:
    a structural base having a generally cylindrical sidewall with an outer side and an inner side, the cylindrical sidewall having a pair of elongated slots closely spaced circumferentially on the cylindrical sidewall and extending in the axial direction;
    an adjustable strap having one end secured at the outer side of the cylindrical sidewall and passing through one of the pair of elongated slots from the outer side of the cylindrical sidewall to the inner side of the cylindrical sidewall, the adjustable strap also wrapping around the inner side of the cylindrical sidewall to the other of the elongated slots, and the other end of the adjustable strap passing through the other slot to the outer side of the cylindrical sidewall, the adjustable strap thus defining a reception cavity within the structural base;

an adjustable attachment on the outer side of the cylindrical sidewall to which the other end of the adjustable strap can be secured for adjustment;

the adjustable strap having an inwardly facing surface;

a cushioning material attached to the inwardly facing surface of the adjustable strap within the structural base; and whereby a container placed in the reception cavity defined in the structural base is substantially circumscribed by the adjustable strap and is grasped around a substantial portion of a periphery of the container in the reception cavity by the adjustable strap, such that the closer the pair of elongated slots, the larger the portion of the periphery of the container that is grasped by the adjustable strap when the other end of the adjustable strap is drawn tight around the container and is secured to the adjustable attachment on the outer side of the cylindrical sidewall.

11. The adjustable container holder as defined in claim 10 wherein the adjustable attachment is a hook and loop fastener.

12. The adjustable container holder as defined in claim 10 wherein the adjustable attachment is a buckle and both ends of the adjustable strap are secured together by the buckle.

13. The adjustable container holder as defined in claim 10 wherein the cushioning material is an elastomeric material.

14. The adjustable container holder as defined in claim 10 wherein the cushioning material is polyethylene foam.

15. An adjustable container holder comprising:

a structural base having a generally cylindrical sidewall with an outer side and an inner side, the cylindrical sidewall having a pair of elongated slots closely spaced circumferentially on the cylindrical sidewall and extending in the axial direction;

an adjustable strap having one end secured at the outer side of the cylindrical sidewall and passing through one of the pair of elongated slots from the outer side of the cylindrical sidewall to the inner side of the cylindrical sidewall, the adjustable strap also wrapping around the inner side of the cylindrical sidewall to the other of the elongated slots, and the other end of the adjustable strap passing through the other slot to the outer side of the cylindrical sidewall, the adjustable strap thus defining a reception cavity within the structural base;

an adjustable attachment on the outer side of the cylindrical sidewall taking the form of a buckle by which both ends of the adjustable strap are joined for adjustment;

whereby a container placed in the reception cavity defined in the structural base is substantially circumscribed by the strap and is grasped around a substantial portion of a periphery of the container in the reception cavity by the adjustable strap, such that the closer the pair of elongated slots, the larger the portion of the periphery of the container that is grasped by the adjustable strap when the other end of the adjustable strap is drawn tight around the container and is secured to the adjustable attachment on the outer side of the cylindrical sidewall.

* * * * *